United States Patent
Gebert

(10) Patent No.: US 12,467,241 B2
(45) Date of Patent: Nov. 11, 2025

(54) RAINWATER RESERVOIR

(71) Applicant: HUSQVARNA AB, Huskvarna (SE)

(72) Inventor: Klaus Gebert, Rettenbach (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/720,644

(22) PCT Filed: Aug. 31, 2022

(86) PCT No.: PCT/EP2022/074167
§ 371 (c)(1),
(2) Date: Jun. 16, 2024

(87) PCT Pub. No.: WO2023/110174
PCT Pub. Date: Jun. 22, 2023

(65) Prior Publication Data
US 2024/0417959 A1    Dec. 19, 2024

(30) Foreign Application Priority Data

Dec. 16, 2021 (EP) ..................................... 21215134

(51) Int. Cl.
*E04D 13/08* (2006.01)
*E03B 1/04* (2006.01)
*E03B 3/02* (2006.01)

(52) U.S. Cl.
CPC ................ *E03B 3/02* (2013.01); *E03B 1/044* (2013.01); *E04D 13/08* (2013.01);
(Continued)

(58) Field of Classification Search
CPC ...... E04D 2013/0813; E04D 2013/082; E04D 2013/0853; E04D 2013/0873; Y10T 137/6969
See application file for complete search history.

(56) References Cited

U.S. PATENT DOCUMENTS

| | | | |
|---|---|---|---|
| 1,074,375 A | 9/1913 | Miller | |
| 2,030,467 A | 2/1936 | Pearce | |

(Continued)

FOREIGN PATENT DOCUMENTS

| | | |
|---|---|---|
| CA | 2222916 A1 | 8/1999 |
| DE | 3526936 A1 | 2/1987 |

(Continued)

OTHER PUBLICATIONS

Machine translation FR 2677686.*
(Continued)

*Primary Examiner* — Kevin F Murphy
(74) *Attorney, Agent, or Firm* — Burr & Forman

(57) ABSTRACT

An insert (400) for a rainwater downpipe (300) is fluidly coupled between a first section (310) and a second section (320) of the rainwater downpipe (300). A rainwater reservoir (500) is defined within the insert (400) to store the rainwater received from the first section (310) therein. The rainwater reservoir (500) includes a side surface (510), a bottom surface (520) and an outlet opening (522) fluidly coupled to the second section (320). A valve element (530) is disposed within the rainwater reservoir (500) to allow or deny the passage of the stored rainwater in the rainwater reservoir (500) through the outlet opening (522). The insert (400) is characterized in that the side surface (510) of the rainwater reservoir (500) further defines a rainwater harvesting opening (549) adapted to allow access to the rainwater stored in the rainwater reservoir (500).

11 Claims, 6 Drawing Sheets

(52) U.S. Cl.
CPC ............... *E03B 2001/047* (2013.01); *E04D 2013/0813* (2013.01); *E04D 2013/082* (2013.01); *E04D 2013/0853* (2013.01); *E04D 2013/0873* (2013.01); *Y10T 137/6969* (2015.04)

(56) References Cited

U.S. PATENT DOCUMENTS

| | | | |
|---|---|---|---|
| 3,481,366 | A | 12/1969 | Mortonson |
| 3,966,121 | A * | 6/1976 | Littman ............... B05B 1/20 239/197 |
| 5,533,303 | A * | 7/1996 | Harvey ............... E03B 3/02 52/16 |
| 6,647,670 | B1 | 11/2003 | Dran |
| 6,701,675 | B1 | 3/2004 | Ekker et al. |
| 7,025,076 | B2 * | 4/2006 | Zimmerman, Jr. ....... E03B 1/04 405/36 |
| 7,395,633 | B2 * | 7/2008 | Baeta ............... E03B 3/03 52/12 |
| 8,167,337 | B2 * | 5/2012 | Bruno ............... F16L 37/04 285/7 |
| 8,741,132 | B2 * | 6/2014 | Graf ............... E04D 13/08 52/12 |
| 9,506,251 | B2 | 11/2016 | Gleason |
| 2006/0266422 | A1 * | 11/2006 | Feenstra ............. F16K 27/0209 137/527 |
| 2012/0068452 | A1 * | 3/2012 | Boettner ............... E04D 13/08 138/140 |
| 2019/0194949 | A1 | 6/2019 | Abbasi |
| 2021/0340770 | A1 * | 11/2021 | Buhler ............... E04D 13/08 |

FOREIGN PATENT DOCUMENTS

| | | | |
|---|---|---|---|
| DE | 202005016515 U1 | 12/2005 | |
| DE | 102013017979 A1 | 6/2015 | |
| EP | 0517202 B1 | 8/1994 | |
| EP | 1469138 B1 | 2/2006 | |
| EP | 3043004 A1 | 7/2016 | |
| FR | 2677686 A1 * | 12/1992 | ............... E03B 3/02 |
| KR | 102249356 B1 | 5/2021 | |

OTHER PUBLICATIONS

International Search Report and Written Opinion of corresponding International Application No. PCT/EP2022/074167 mailed Nov. 28, 2022, all pages cited in its entirety.

International Preliminary Report on Patentability of corresponding International Application No. PCT/EP2022/074167 mailed Mar. 1, 2024, all pages cited in its entirety.

\* cited by examiner

SECTION A-A

RAINWATER RESERVOIR

TECHNICAL FIELD

The present disclosure relates to a rainwater reservoir. More specifically, the present disclosure relates to the rainwater reservoir allowing for accessing rainwater flowing through a rainwater gulley or gutter into a rainwater downpipe.

BACKGROUND

Conventionally, rainwater flowing from a rainwater gulley or gutter of a building, or the like may be directed through a rainwater downpipe and drained via a drainage pipe embedded in the ground. Often, it is desirable to utilize a significant portion of the rainwater flowing from the rainwater downpipe for general applications such as, but not limited to, gardening, cleaning etc. A well-known design around of the rainwater downpipe for utilizing rainwater involves removing a portion of the rainwater downpipe at a significant distance from its discharge or drainage end to create an opening. The opening may then be supplemented with accessories (say a hose) to bifurcate the rainwater flow. A significant portion of the rainwater may then be utilized for various general and industrial applications. The rainwater bifurcated with these improved rainwater downpipes needs additional space or reservoirs external to the rainwater downpipe for storage purposes.

However, it is not always feasible to store rainwater in such external reservoirs due to space constraints on a roof or a balcony, maintenance expenses and aesthetic concerns among other vital factors. Hence, there is a need of an improved rainwater downpipe, which may overcome aforementioned difficulties and may allow accessing rainwater in an efficient manner to be used for various general and industrial applications.

An example of a rainwater downpipe with a rainwater reservoir is provided in European patent 1,469,138 (hereinafter referred to as '138 reference). The '138 reference provides a collector that includes a receptacle with an opening to which a fluid evacuation conduit is connected towards a tank. A funnel encircles the receptacle in a sliding way by a smaller diameter part and is bored with a set of openings emerging in a pipe. A control unit makes the receptacle elastically integrated to the pipe, such that the receptacle closes or opens the openings to send or prevent the fluid towards the tank. The control unit has a horizontal rigid arm, openings, a spring, and a fixed support. However, there is still a need of an improved and an aesthetically pleasing design of the rainwater downpipe and the rainwater reservoir assembly. Moreover, it is desired that the design should be simple enough to implement within an existing downpipe installation and free from any complex piping arrangements.

EP 0 517 202 B1 (hereinafter referred to as '202 reference) discloses a further example of a device for diverting rainwater from a downpipe. The device comprises a reservoir having a circular wall. A sieve basket is arranged at a lower portion of the circular wall. At its bottom side, the reservoir is enclosed by a valve embodied as a circular flat plate. The valve is movable about a pivot and is held in a closed configuration by a spring controlled holding mechanism. When the valve is open, the sieve basket is cleaned by passing rainwater. After cleaning the sieve basket, the valve is closed, and rainwater is diverted from the downpipe. Therefore, the '202 reference discloses that the valve forms the bottom part and even the bottom surface of the reservoir. Hence, the '202 reference falls short on providing a valve element disposed within the rainwater reservoir.

Additionally, the '202 reference discloses that the spring controlled holding mechanism comprises a spring coupled at its one end via a coupling nose to the valve and on its other end via a levering mechanism to a wall of an outlet pipe. When a water level reaches a limiting level, the floating element triggers the valve to start cleaning the sieve basket by passing rainwater. Therefore, the '202 reference falls additionally shot to provide a biasing element coupled with the valve element on one end and any one of the side surface or the bottom surface of the rainwater reservoir on the other end, wherein the biasing element is adapted to allow the valve element to move to the second position after a weight of the rainwater stored in the rainwater reservoir crosses a threshold weight. However, there is still a need of an improved and an aesthetically pleasing design of the rainwater downpipe and the rainwater reservoir assembly. Moreover, it is desired that the design should be simple enough to implement within an existing downpipe installation and free from any complex piping arrangements.

SUMMARY

In view of the above, it is an objective of the present invention to solve or at least reduce the drawbacks discussed above. The objective is at least partially achieved by an insert for a rainwater downpipe. The rainwater downpipe defines a first section and a second section disposed downstream of the first section. The insert includes a top portion fluidly coupled with the first section. The insert further includes a bottom portion fluidly coupled with the second section. A rainwater reservoir is defined between the top portion and the bottom portion. The rainwater reservoir is adapted to store the rainwater received from the first section therein. The rainwater reservoir includes a side surface and a bottom surface. The rainwater reservoir further includes an outlet opening fluidly coupled to the second section. A valve element is disposed within the rainwater reservoir. The valve element is adapted to move between a first position and a second position. In the first position, the valve element denies passage of the stored rainwater in the rainwater reservoir through the outlet opening. In the second position, the valve element allows passage of the stored rainwater in the rainwater reservoir through the outlet opening. A biasing element is coupled with the valve element on one end and any one of the side surface or the bottom surface on the other end. The biasing element biases the valve element in the first position. The biasing element is adapted to allow the valve element to move to the second position after a weight of the rainwater stored in the rainwater reservoir crosses a threshold weight. The insert is characterized in that the side surface of the rainwater reservoir further defines a rainwater harvesting opening adapted to allow access to the rainwater stored in the rainwater reservoir.

Thus, the present disclosure advantageously provides the insert which may be retrofitted on an existing installation such as the rainwater downpipe. The retrofitting process is simple and convenient to execute. The insert looks aesthetically pleasing as well when fitted with the rainwater downpipe. The insert automatically stores or drains the rainwater depending on the movement of the valve element. The insert allows access to the stored rainwater via the rainwater harvesting opening on the side surface without requiring any complex piping circuits or any other structural arrangements. The insert requires very little or no maintenance. The insert allows recovery of rainwater for general applications like gardening etc. Further, the insert eliminates the need for an additional storage space or containers to store the rainwater external to the rainwater downpipe.

Therefore, the insert according to the present invention provides a mechanically reliable and low-maintenance insert for storing rainwater, which may be simply and conveniently installed in an existing downpipe.

According to the present invention, the bottom surface may be seen as a bottom end of the rainwater reservoir and at the same time a boundary between the rainwater reservoir and the bottom portion of the insert. In contrast, according to the present invention, the bottom wall may be defined as a supplementary part of the rainwater reservoir positioned between the first chamber and the second chamber which may both be parts of the rainwater reservoir. Further, the first chamber may include a side surface and an intermediate wall surface such that the side surface and the intermediate wall surface may be connected to each other via the bottom wall.

Furthermore, according to the present invention, the rainwater reservoir is adapted to store the rainwater received from the first section therein. Hence, it is clear that the rainwater reservoir may store the rainwater in at least a portion of its entire extension. This may particularly refer to the entire longitudinal extension of the insert seen from the top portion to the bottom portion or vice versa. Therefore, the rainwater may be stored in the first chamber of the rainwater reservoir and may be drained away via openings in the second chamber.

The valve element according to the present invention may be arranged between the first chamber and the second chamber and therefore arranged within the rainwater reservoir.

According to an embodiment of the present disclosure, the rainwater harvesting opening includes a water filter. The water filter may separate debris or other foreign elements from the stored rainwater. The water filter may advantageously make the rainwater fitter for household usage.

According to an embodiment of the present disclosure, the rainwater harvesting opening is configured to be fluidly connected to a pump such that the pump is fluidly connected to one or more of an irrigation tank, or a water filtration tank. The rainwater from the rainwater harvesting opening may be pumped further to remote locations for storage, or to the water filtration tank for making the rainwater potable for drinking purposes.

According to an embodiment of the present disclosure, the rainwater harvesting opening includes a cap for covering the rainwater harvesting opening. The rainwater harvesting opening may be covered by the cap when an access to the rainwater is not required. The weight of the rainwater stored in the rainwater reservoir may then cross the threshold weight such that the valve element moves to the second position for allowing drainage of the rainwater in the ground. Additionally, the cap may avoid entry of any foreign elements inside the rainwater reservoir through the rainwater harvesting opening when rainwater access is not required.

According to an embodiment of the present disclosure, the rainwater harvesting opening includes two halves such that one half of the rainwater harvesting opening is fluidly connected to an external water supply and another half is fluidly connected to a tap. In absence of rainfall, the rainwater harvesting opening may be supplied with water so that the people (say gardeners) working near the rainwater downpipe may still get an access to water to fill a can for watering the plants, or any other such suitable applications.

According to an embodiment of the present disclosure, the rainwater harvesting opening is a circular opening. The circular opening may promote fluid connection with conventional hoses, which typically have a circular cross-section.

According to an embodiment of the present disclosure, the rainwater harvesting opening includes latches or threaded coupling portion for secure connection with one or more hoses. The latches may strengthen the fluid connection between the rainwater harvesting opening and the one or more hoses. The latches may prevent an inadvertent disassembly of the one or more hoses with the rainwater harvesting opening in case of high rainwater pressure or twisting/turning of the one or more hoses due to external factors. Similarly, the one or more hoses with a threaded portion may be directly and securely connected with the rainwater harvesting opening via the threaded coupling portion.

According to an embodiment of the present disclosure, the diameter of the rainwater harvesting opening is adjustable. The rainwater harvesting opening may cater to fluid connection with the one or more hoses of any known dimensions.

According to an embodiment of the present disclosure, the biasing element is one or more of a compression spring, or a torsion spring. The compression spring, or the torsion spring may effectively bias the valve element to the first position and the second position for an efficient working of the insert.

According to an embodiment of the present disclosure, the top portion and the bottom portion of the insert are expandable along a direction perpendicular to a central axis of the rainwater downpipe. The insert may be expandable to ensure secure fluid connection with the rainwater downpipe of any known dimensions.

According to an embodiment of the present disclosure, the top portion and the bottom portion of the insert are telescopic along the central axis of the rainwater downpipe. The telescopic nature of the insert may still allow the insert to fluidly connect with the rainwater downpipe even if there is an error in the cutting of a portion of the rainwater downpipe during installation of the insert in the rainwater downpipe.

According to an embodiment of the present disclosure, the rainwater reservoir defines a first chamber and a second chamber such that in the first position of the valve element, the rainwater enters the first chamber and in the second position of the valve element, the rainwater enters the second chamber. The rainwater may be stored for various general and industrial applications in the first chamber of the rainwater reservoir. Further, the rainwater may be drained away via openings in the second chamber in case the rainwater is not required for use. Further, any debris or dirt etc. may settle down in the second chamber, thus allowing an access to a substantially cleaner rainwater stored in the first chamber.

According to an embodiment of the present disclosure, the bottom surface of the rainwater reservoir defines the outlet opening. The outlet opening may allow for drainage of the rainwater when the rainwater is not required for use in various general and industrial applications. Also, when the weight of the stored rainwater exceeds the threshold weight, the outlet opening may allow to drain at least a portion of the stored rainwater out.

According to an embodiment of the present disclosure, the outlet opening allows passage of foreign elements along with the rainwater. In an embodiment, the foreign elements may be a chunk of debris. The outlet opening may allow the passage of the foreign elements and may further prevent the insert from blockages.

According to an embodiment of the present disclosure, the insert is provided with the rainwater downpipe, wherein the insert is inserted in the rainwater downpipe such that the rainwater is storable within the rainwater reservoir and the first section of the rainwater downpipe above the insert. Thereby, an extension of a fluid volume fillable with stored rainwater of the rainwater reservoir allows more rainwater to be stored for usage and access through the rainwater harvesting opening. Additionally, a user may accordingly design the biasing element as per requirements of amount of rainwater to be stored.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
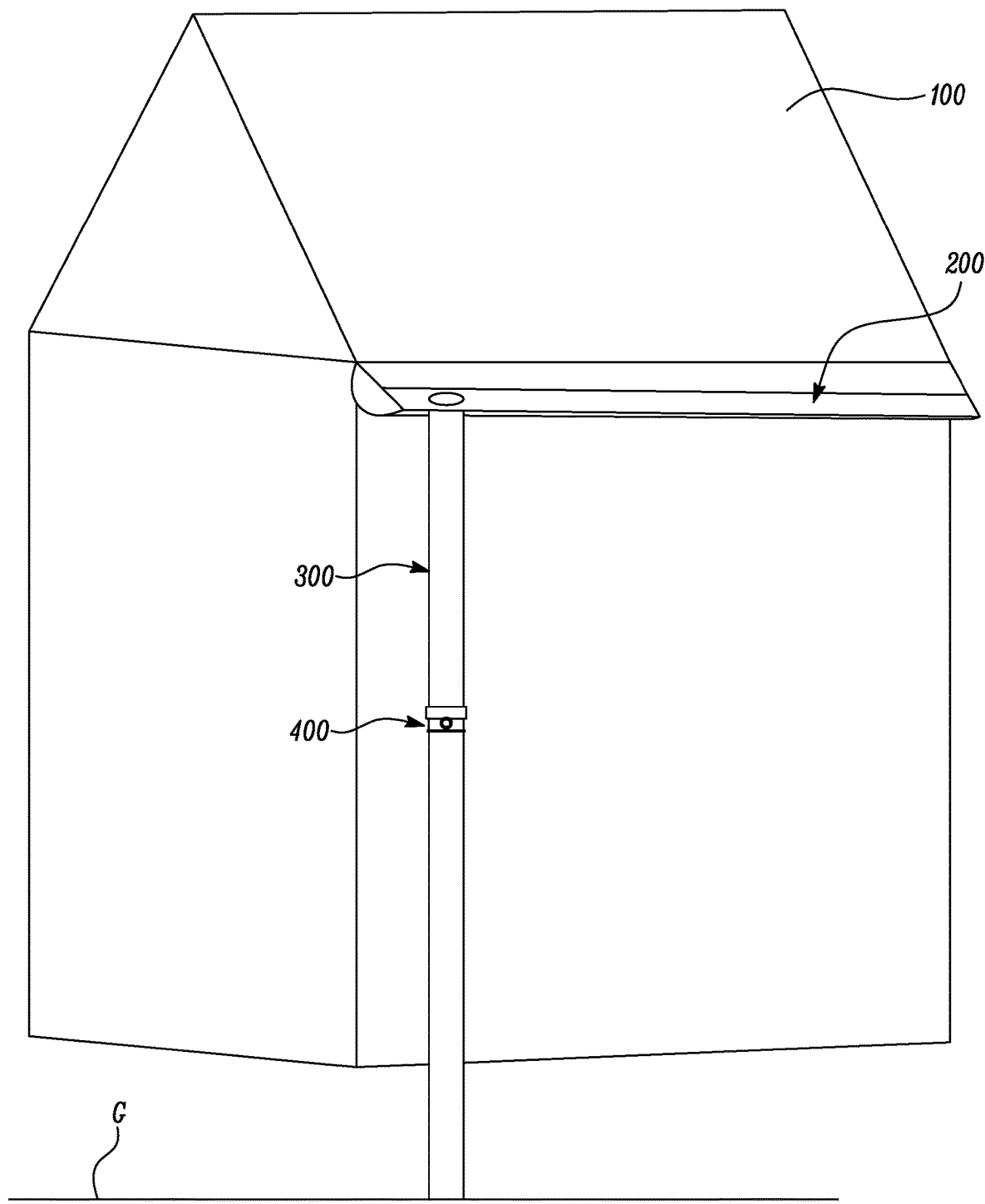
FIG. 1 shows a schematic view of a roof equipped with a rainwater downpipe and an insert assembly, in accordance with an aspect of the present disclosure.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates a horizontal gutter 200 disposed at a base of a roof 100 for receiving rainwater and conveying it to a rainwater downpipe 300. The rainwater downpipe 300 drains the rainwater via a drainage pipe (not shown) embedded in ground "G". However, due to water shortage in the world, it is very much essential to judiciously use the rainwater and reduce wastage of the rainwater. Hence, a significant portion of the rainwater flowing from the rainwater downpipe 300 may be advantageously recovered, and accessed for general applications such as, but not limited to, gardening, cleaning etc. The rainwater downpipe 300 is retrofitted with an insert 400 which may store and allow access to the rainwater which may otherwise drain away to the ground and may get wasted. This may not only save rainwater but also save space which may otherwise be occupied by containers to store the rainwater.

Figure 2:
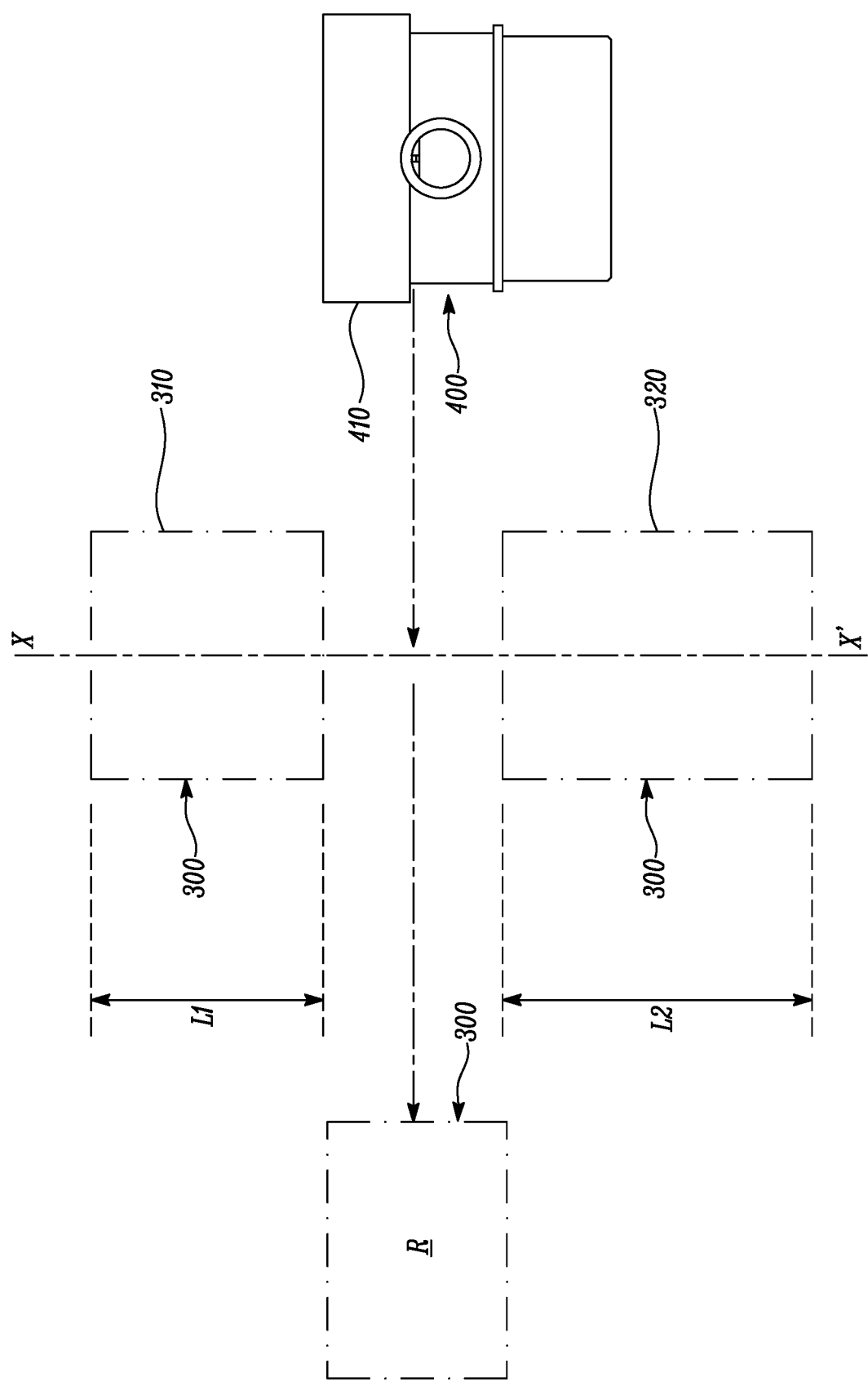
FIG. 2 shows a schematic view of retrofitting of an insert within a downpipe, in accordance with an aspect of the present disclosure.
Figure 3:
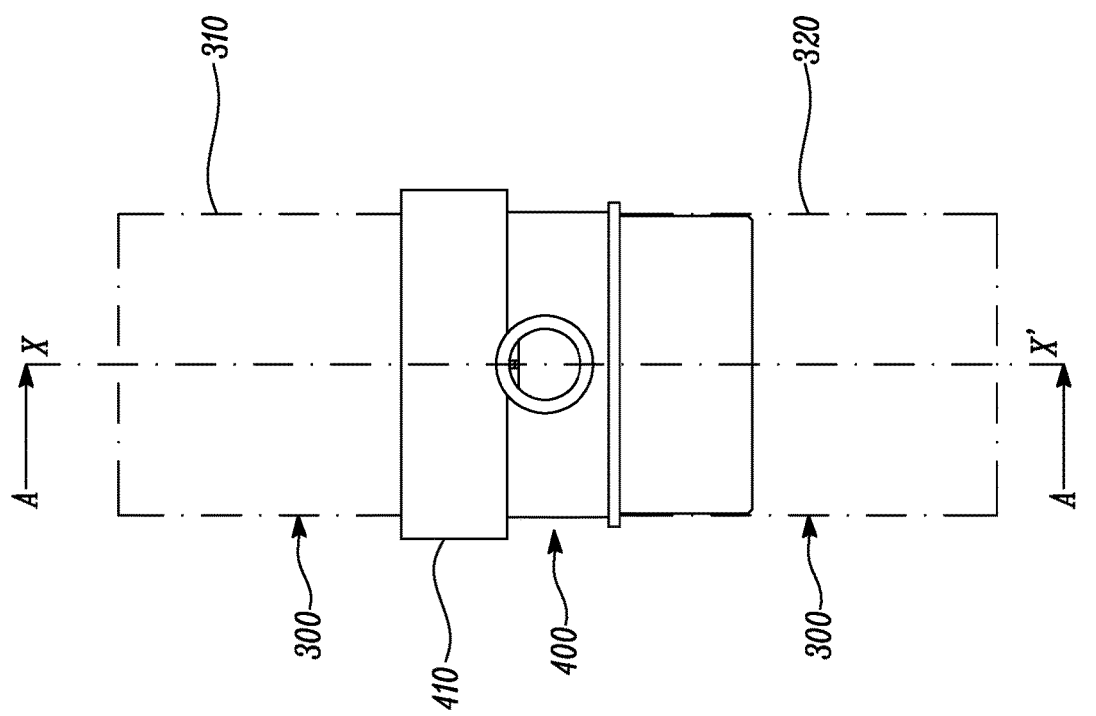
FIG. 3 shows a front view of the rainwater downpipe and the insert assembly, in accordance with an aspect of the present disclosure.

As illustrated in FIGS. 2 and 3, the insert 400 is retrofitted to the rainwater downpipe 300 by removing a portion "R" or a sector of the rainwater downpipe 300. The removal of the portion "R" of the rainwater downpipe 300 may be done by any means known in the art without limiting the scope of the present disclosure. For example, the portion "R" may be cut away with any known cutting tools. After the portion "R" of the rainwater downpipe 300 is removed, the rainwater downpipe 300 defines a first section 310 and a second section 320 disposed downstream of the first section 310. Respective lengths "L1, L2" of the first section 310 and the second section 320 may vary depending on the size of the insert 400, height of a balcony/floor (not shown) from where rainwater is accessed among other factors. The insert 400 includes a top portion 410 fluidly coupled with the first section 310. The insert 400 further includes a bottom portion 420 (as shown in FIG. 4) fluidly coupled with the second section 320.

In some embodiments, the coupling between the rainwater downpipe 300 and the insert 400 may be a snap coupling. In some embodiments, the coupling between the rainwater downpipe 300 and the insert 400 may be a tool-less coupling. In some embodiments, the coupling between the rainwater downpipe 300 and the insert 400 may involve application of fasteners. In some embodiments, the coupling between the rainwater downpipe 300 and the insert 400 may be achieved by welding. However, actual implementation of the coupling of the rainwater downpipe 300 and the insert 400 of the present disclosure may involve any other means known in the art without limiting the scope of the present disclosure.

Figure 4:
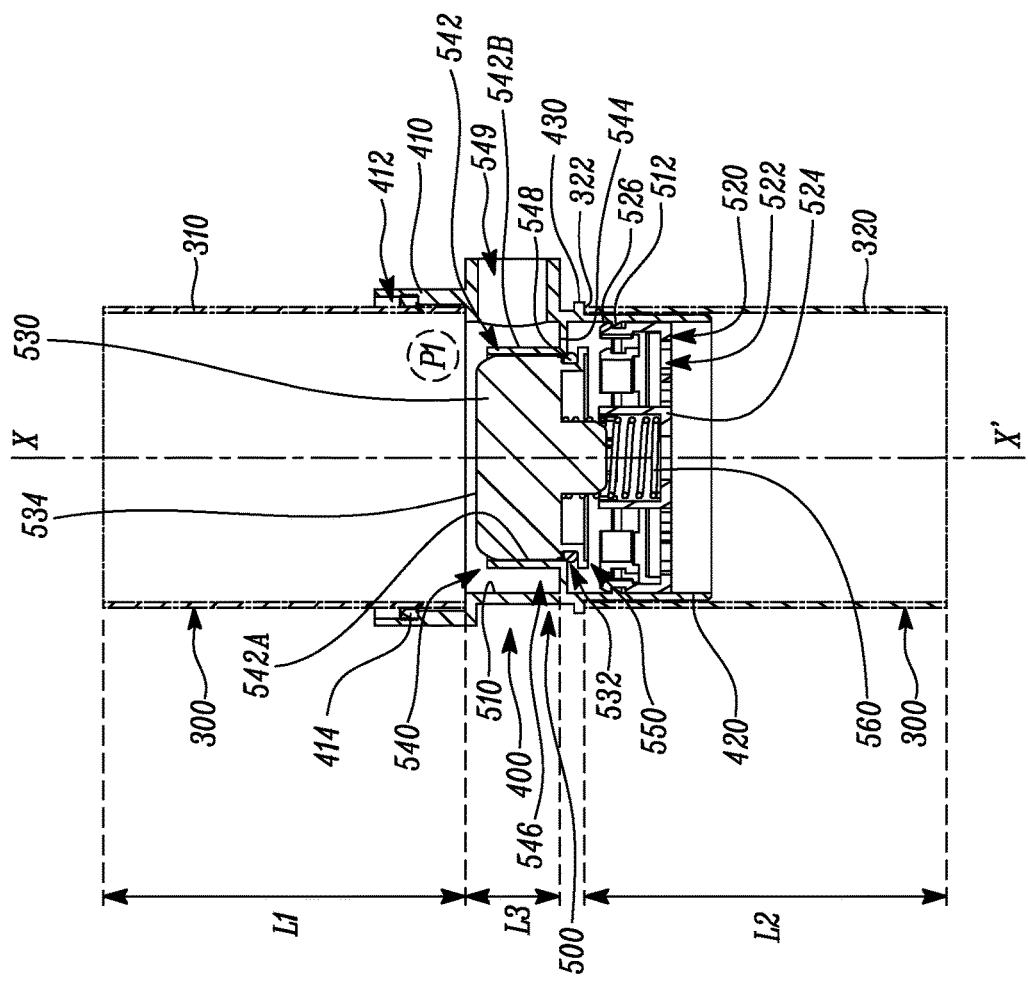
FIG. 4 shows a cross-sectional view of FIG. 3 taken along A-A plane, with a valve element in a first position, in accordance with an aspect of the present disclosure.
Figure 5:
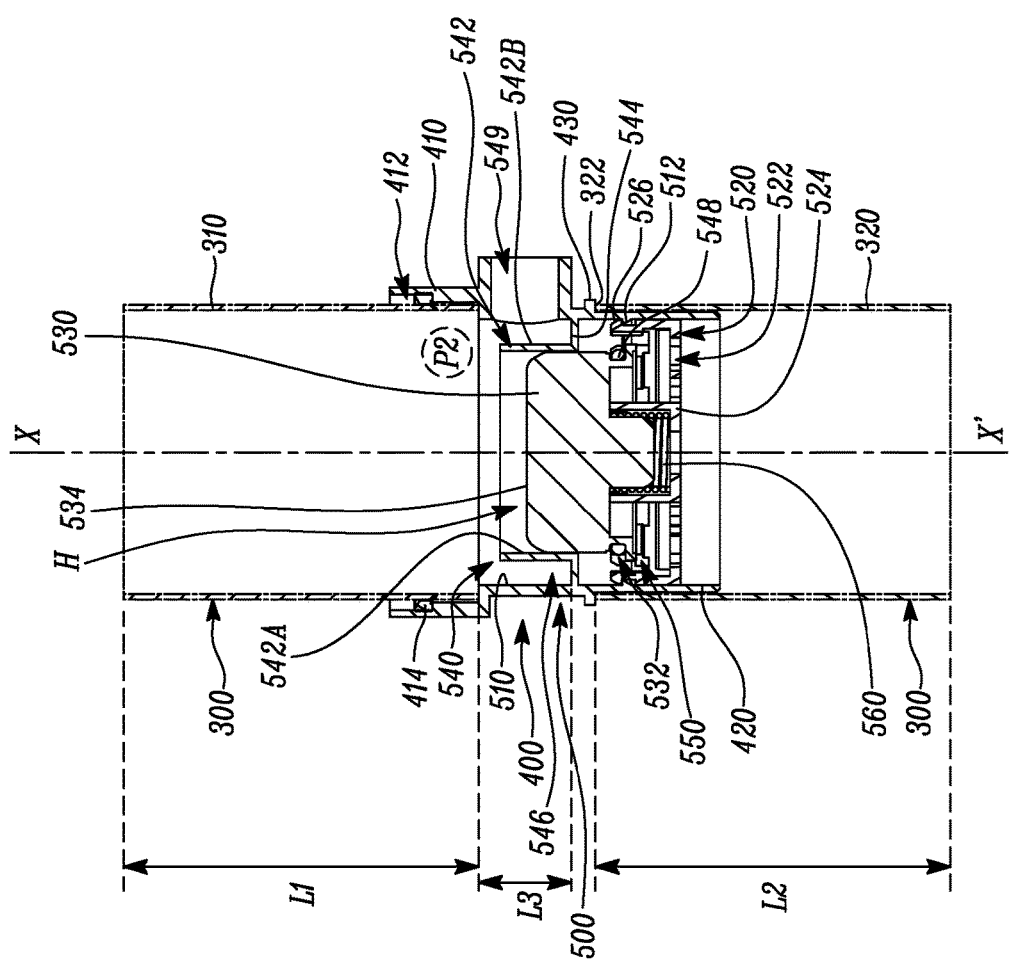
FIG. 5 shows a cross-sectional view of FIG. 3 taken along A-A plane, with the valve element in a second position, in accordance with an aspect of the present disclosure.

As illustrated in FIGS. 4 and 5, the top portion 410 of the insert 400 further includes a recess 412 to hold a sealing element 414 such as, but not limited to, an O-ring, a gasket, or any other such sealing element which may be suitable for usage with various aspects of the present disclosure. The sealing element 414 may fluidly seal the coupling between the top portion 410 of the insert 400 and the first section 310 of the rainwater downpipe 300. The top portion 410 of the insert 400 may be visible from outside the rainwater downpipe 300. However, the bottom portion 420 of the insert 400 may not be visible from outside the rainwater downpipe 300. Further, the insert 400 includes a protrusion 430 between the top portion 410 and the bottom portion 420. The protrusion 430 allows the insert 400 to sit on a top edge 322 of the second section 320 of the rainwater downpipe 300.

In some embodiments, the top portion 410 and the bottom portion 420 of the insert 400 may be expandable along a direction perpendicular to a central axis X-X' of the rainwater downpipe 300. The insert 400 may be expandable to ensure secure fluid connection with the rainwater downpipe 300 of any known dimensions. The insert 400 may be expanded with any method known in the art without limiting the scope of the present disclosure.

In some embodiments, the top portion 410 and the bottom portion 420 are telescopic along the central axis X-X' of the rainwater downpipe 300. The telescopic nature of the insert 400 may still allow the insert 400 to fluidly connect with the rainwater downpipe 300 even if there is an error in cutting of the portion of the rainwater downpipe 300 during installation or retrofitting of the insert 400 in the rainwater downpipe 300. The telescopic nature of the insert 400 may also case the overall installation or retrofitting of the insert 400. A user may simply align the insert 400 along the central axis X-X' of the rainwater downpipe 300 and then telescope the top portion 410 and the bottom portion 420 of the insert 400 for respective couplings with the first section 310 and the second section 320 of the rainwater downpipe 300.

In some embodiments, the insert 400 may be made from an elastoplastic material. In some embodiments, the insert 400 may be made from an elastic material. In some embodiments, the insert 400 may be made from a corrosion resistant material. In some embodiments, the insert 400 may be made from a hydrophobic material. However, actual implementation of the present disclosure may use any material known in the art without limiting the scope of the present disclosure.

With continued reference to FIGS. 4 and 5, a rainwater reservoir 500 is defined between the top portion 410 and the bottom portion 420 of the insert 400. The rainwater reservoir 500 is adapted to store the rainwater received from the first section 310 therein. The rainwater reservoir 500 includes a side surface 510 and a bottom surface 520. The rainwater reservoir 500 further includes an outlet opening 522 fluidly coupled to the second section 320. In the illustrated embodiment, the outlet opening 522 is defined by the bottom surface 520 of the rainwater reservoir 500.

The insert 400 further includes a valve element 530 disposed within the rainwater reservoir 500. The valve element 530 is adapted to move between a first position "P1" and a second position "P2". In the first position "P1" (as shown in FIG. 4), the valve element 530 denies passage of the stored rainwater in the rainwater reservoir 500 through the outlet opening 522. In the second position "P2" (as shown in FIG. 5), the valve element 530 allows passage of the stored rainwater in the rainwater reservoir 500 through the outlet opening 522. The outlet opening 522 allows for the drainage of the rainwater when the rainwater is not required for use in various general and industrial applications.

The insert 400 further includes a biasing element 560 coupled with the valve element 530 on one end and any one of the side surface 510 or the bottom surface 520 on the other end. It should be contemplated that the present disclosure is not limited by choice of surface for coupling of the biasing element 560. The biasing element 560 biases the valve element 530 in the first position "P1". The biasing element 560 is adapted to allow the valve element 530 to move to the second position "P2" after a weight of the rainwater stored in the rainwater reservoir 500 crosses a threshold weight.

In some embodiments, the biasing element 560 may be one or more of a compression spring, or a torsion spring. The compression spring, or a torsion spring may effectively bias the valve element 530 to the first position "P1" and the second position "P2" for efficient working of the insert 400. The compression spring may be preferable when one end of the biasing element 560 is coupled to the bottom surface 520 of the rainwater reservoir 500. The torsion spring may be preferable when one end of the biasing element 560 is coupled to the side surface 510 of the rainwater reservoir 500. The threshold weight may depend upon a variety of factors such as, but not limited to, an overall weight of the insert 400, material composition of the insert 400, compression or torsion coefficient of the biasing element 560, effective density of rainwater, height of the insert 400 above the ground "G" etc.

Further, the rainwater reservoir 500 defines a first chamber 540 and a second chamber 550. The rainwater may be stored for various general and industrial applications in the first chamber 540 of the rainwater reservoir 500. Further, the second chamber 550 may provide passage to the stored rainwater for drainage when the rainwater is not required for use or when the weight of the rainwater stored in the rainwater reservoir 500 crosses the threshold weight. The first chamber 540 includes the side surface 510 and an intermediate wall surface 542 such that the side surface 510 and the intermediate wall surface 542 are connected to each other via a bottom wall 544. The side surface 510, the intermediate wall surface 542 and the bottom wall 544 together form a channel 546 to store rainwater when the valve element 530 is in the first position "P1".

Thus, the first chamber 540 includes the channel 546 and the hollow surface "H" for housing the valve element 530. The valve element 530 in the first position "P1", is coupled to an inner surface 542A of the intermediate wall surface 542 such that the valve element 530 maintains a sealing connection with the inner surface 542A of the intermediate wall surface 542. The inner surface 542A of the intermediate wall surface 542 faces opposite to an outer surface 542B of the intermediate wall surface 542. The outer surface 542B of the intermediate wall surface 542 faces the side surface 510. The sealing between the valve element 530 in the first position "P1" and the inner surface 542A of the intermediate wall surface 542 may be achieved by a sealing element 548 such as, but not limited to, an O-ring, a gasket, or any other similar sealing element suitable for usage with various aspects of the present disclosure.

The sealing element 548 may be held in place by a recess 532 in the valve element 530. Thus, the channel 546 and the top surface 534 of the valve element 530 in the first position "P1" together form a base surface for the storage of the rainwater. Further the side surface 510 defines a rainwater harvesting opening 549 adapted to allow access to the rainwater stored in the rainwater reservoir 500 or the first chamber 540 of the rainwater reservoir 500. In some embodiments, the length "L3" of the first chamber 540 may be large enough to allow some space below the rainwater harvesting opening 549 in the side surface 510. This may prevent foreign elements in the rainwater to evacuate from the first chamber 540 via the rainwater harvesting opening 549 as the foreign elements may then settle down in the channel 546 or on a top surface 534 of the valve element 530.

The second chamber 550 includes the side surface 510 and the bottom surface 520. The bottom surface 520 defines the outlet opening 522 and the valve element seat 524. The bottom surface 520 further includes one or more tabs 526 to latch onto one or more protrusions 512 in the side surface 510. The outlet opening 522 may allow passage of foreign elements along with the rainwater, wherein the foreign elements may be a chunk of debris. Thus, the outlet opening 522 may allow the passage of the foreign elements and may prevent the insert 400 from blockages.

With continued reference to FIGS. 4 and 5, in operation, in the first position "P1" of the valve element 530, the rainwater enters the first chamber 540 and in the second position "P2" of the valve element 530, the rainwater enters the second chamber 550. The rainwater may be stored for various general and industrial applications in the first chamber 540 of the rainwater reservoir 500. Further, the rainwater may be drained away via the outlet opening 522 in the second chamber 550 in case the rainwater is not required for use.

The rainwater harvesting opening 549 defined in the side surface 510 of the water reservoir may further be provided with a plurality of accessories to improve the utility of the rainwater harvesting opening 549 or the rainwater being accessed from it.

In some embodiments, the rainwater harvesting opening 549 may include a water filter. The water filter may separate the debris or other foreign elements from the rainwater. The water filter may advantageously make the rainwater potable.

In some embodiments, the rainwater harvesting opening 549 may be fluidly connected to a pump (not shown) such that the pump is fluidly connected to one or more of an irrigation tank, or a water filtration tank. The rainwater from the rainwater harvesting opening 549 may be pumped to remote locations for storage, or to the water filtration tank for making water potable for drinking purposes.

In some embodiments, the rainwater harvesting opening 549 may include a cap for covering the rainwater harvesting opening 549. The rainwater harvesting opening 549 may be covered by the cap when an access to the rainwater is not required. The weight of the rainwater stored in the rainwater reservoir 500 may then cross the threshold weight such that the valve element 530 moves to the second position "P2" for allowing drainage of the rainwater in the ground "G". Additionally, the cap may prevent entry of any foreign elements inside the rainwater reservoir 500 through the rainwater harvesting opening 549 when access to the rainwater is not required. The cap may be pivotably coupled to the rainwater harvesting opening 549. However, in actual implementation of the present disclosure, the cap may be coupled to the rainwater harvesting opening 549 by any suitable means known in the art without limiting the scope of the present disclosure in any manner.

In some embodiments, the rainwater harvesting opening 549 may include a partition plate to divide the rainwater harvesting opening 549 into two halves. One half of the rainwater harvesting opening 549 may be fluidly connected to an external water supply and another half of the rainwater harvesting opening 549 may be fluidly connected to a tap. In absence of rainfall, the rainwater harvesting opening 549 may be supplied with water so that the people (say gardeners) working near the rainwater downpipe 300 may still get an access to water to fill a can for watering the plants or any other suitable application purposes.

In some embodiments, the rainwater harvesting opening 549 may be a circular opening. The circular opening may promote fluid connection with conventional hoses, which typically have a circular cross-section. In some embodiments, the rainwater harvesting opening 549 may have any other cross-sectional shape as well without posing any limitations to the overall scope of the present disclosure.

In some embodiments, the rainwater harvesting opening 549 may include latches or threaded coupling portions for secure connection with one or more hoses. The latches may strengthen the fluid connection between the rainwater harvesting opening 549 and the one or more hoses. The latches may prevent inadvertent disassembly of the one or more hoses with the rainwater harvesting opening 549 in case of high rainwater pressure or twisting/turning of the one or more hoses due to external factors. Similarly, the one or more hoses with a threaded portion may be directly and securely connected with the rainwater harvesting opening 549 via the threaded coupling portion.

In some embodiments, the diameter of the rainwater harvesting opening 549 may be made adjustable. The rainwater harvesting opening 549 may then be able to cater to fluid connection with the one or more hoses of any known dimensions.

Thus, the present disclosure provides the insert 400 which may be retrofitted on an existing installation such as the rainwater downpipe 300. The retrofitting process is simple and convenient to perform. The insert 400 looks aesthetically pleasing with the rainwater downpipe 300. The insert 400 automatically stores or drains the rainwater depending on the movement of the valve element 530. The insert 400 allows evacuation of rainwater via the rainwater harvesting opening 549 on the side surface 510 without requiring any complex piping circuits. The insert 400 requires very little or no maintenance. The insert 400 allows recovery of the rainwater for general applications like gardening, drinking etc. The insert 400 eliminates the need for additional containers to store the rainwater.

Figure 6:
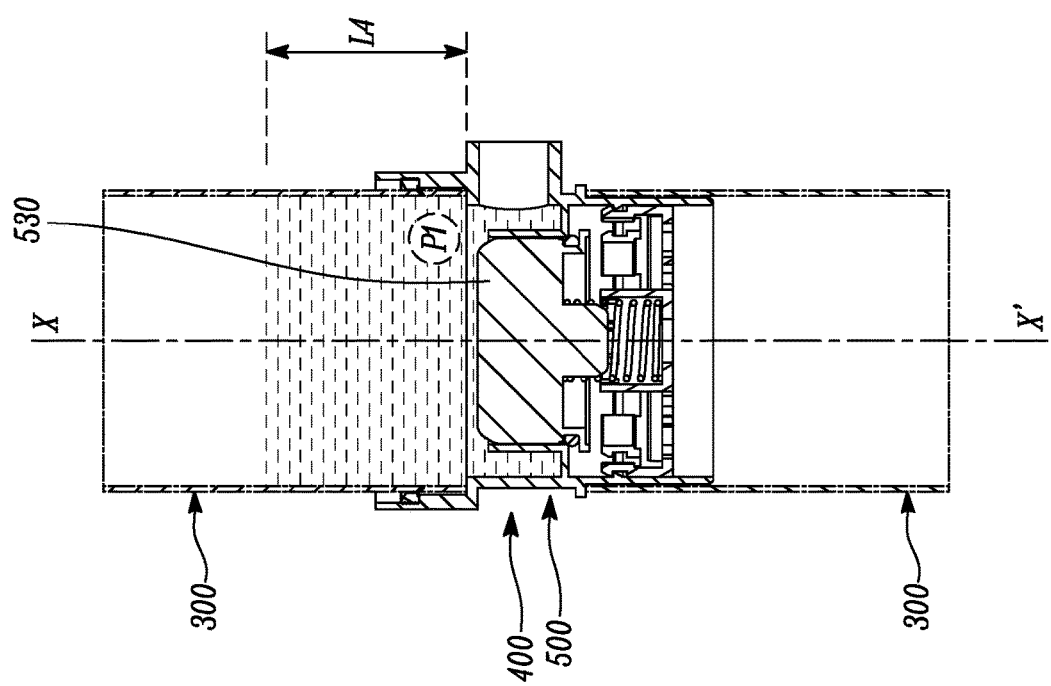
FIG. 6 shows the rainwater reservoir including parts of the downpipe, in accordance with an aspect of the present disclosure.

FIG. 6 illustrates another embodiment of the present disclosure. The rainwater downpipe 300 houses the insert 400. The insert 400 further defines the rainwater reservoir 500. The rainwater reservoir 500 includes the valve element 530 which moves between the first position P1 and the second position P2. FIG. 6 illustrates the valve element 530 in the first position P1. In the illustrated embodiment, the insert 400 is inserted in the rainwater downpipe 300 such that the rainwater is additionally storable within the first section 310 of the rainwater downpipe 300 above the insert 400. This advantageously allows more rainwater to be stored within the rainwater reservoir 500.

A length L4 of extension of the stored rainwater along the rainwater downpipe 300 above the insert 400 may depend upon a weight of water which may be withstood by the biasing element 560. The biasing element 560, which may be a compression spring, may be designed accordingly such that the length of extension of the stored rainwater along the rainwater downpipe 300 may be suitably determined. A compression spring with a higher stiffness may withstand a greater length of the rainwater stored within the rainwater downpipe 300, compared to a compression spring with a lower stiffness.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Roof
200 Gutter
300 Rainwater Downpipe
310 First Section
320 Second Section
322 Top Edge
400 Insert
410 Top Portion
412 Recess
414 Sealing Element 420 Bottom Portion
430 Protrusion
500 Rainwater Reservoir
510 Side surface
512 Protrusions
520 Bottom surface
522 Outlet opening
524 Valve element seat
526 Tabs
530 Valve element
532 Recess
534 Top surface
P1 First Position
P2 Second Position
540 First chamber
542 Intermediate wall surface
542A Inner surface
542B Outer surface
544 Bottom Wall
546 Channel
548 Scaling Element
549 Rainwater Harvesting Opening
550 Second Chamber
560 Biasing Element
X-X' Central Axis
R Portion
L1 Length
L2 Length
L3 Length
L4 Length
H Hollow Surface
G Ground

The invention claimed is:

1. An insert for a rainwater downpipe for storing and accessing the stored rainwater,
the rainwater downpipe defining a first section and a second section disposed downstream of the first section, and
the insert comprising:
a top portion fluidly coupled with the first section;
a bottom portion fluidly coupled with the second section; wherein the insert is inserted in the rainwater downpipe with the insert overlapping the first section and the second section; and
a rainwater reservoir defined between the top portion and the bottom portion and defining a first chamber and a second chamber,
wherein the first chamber is adapted to store the rainwater received from the first section therein,
the rainwater reservoir including
a side surface and a bottom surface;
an outlet opening fluidly coupled to the second section;
a valve element disposed within the rainwater reservoir, the valve element adapted to move between a first position and a second position such that the valve element denies passage of the stored rainwater in the rainwater reservoir through the outlet opening in the first position and the valve element allows passage of the stored rainwater in the rainwater reservoir through the outlet opening in the second position; and
a biasing element coupled with the valve element on one end and any one of the side surface or the bottom surface on the other end, wherein the biasing element biases the valve element in the first position, and wherein the biasing element is adapted to allow the valve element to move to the second position after a weight of the rainwater stored in the rainwater reservoir crosses a threshold weight,
the side surface further defines a rainwater harvesting opening adapted to allow access to the rainwater stored in the rainwater reservoir,
wherein the overlap of the insert and the first section of the rainwater downpipe allows to additionally store water within the first section above the insert, and
wherein the biasing element is centrally disposed along an axial direction of fluid flow of the rainwater.

2. The insert of claim 1, wherein the rainwater harvesting opening includes a water filter.

3. The insert of claim 1, wherein the rainwater harvesting opening is configured to be fluidly connected to a pump such that the pump is fluidly connected to one or more of an irrigation tank, or a water filtration tank.

4. The insert of claim 1, wherein the rainwater harvesting opening includes a cap for covering the rainwater harvesting opening.

5. The insert of claim 1, wherein the rainwater harvesting opening is a circular opening.

6. The insert of claim 1, wherein the rainwater harvesting opening includes latches or a threaded coupling portion for secure connection with one or more hoses.

7. The insert of claim 1, wherein the biasing element is one or more of a compression spring, or a torsion spring.

8. The insert of claim 1, wherein the top portion and the bottom portion of the insert are telescopic along the central axis of the rainwater downpipe.

9. The insert of claim 1, wherein the rainwater reservoir defines the first chamber and the second chamber such that in the first position of the valve element, the rainwater enters the first chamber and in the second position of the valve element, the rainwater enters the second chamber.

10. The insert of claim 1, wherein the bottom surface of the rainwater reservoir defines the outlet opening.

11. The insert of claim 1, wherein the outlet opening allows passage of foreign elements along with the rainwater.

* * * * *